United States Patent
Weinzierle et al.

(10) Patent No.: US 9,212,942 B2
(45) Date of Patent: Dec. 15, 2015

(54) WAVEGUIDE COUPLING, HIGH-FREQUENCY MODULE, FILL-LEVEL RADAR AND USE

(71) Applicant: VEGA Grieshaber KG, Wolfach (DE)

(72) Inventors: Christian Weinzierle, Wolfach (DE); Daniel Schultheiss, Hornberg (DE)

(73) Assignee: VEGA Grieshaber KG, Wolfach (DE)

( * ) Notice: Subject to any disclaimer, the term of this patent is extended or adjusted under 35 U.S.C. 154(b) by 229 days.

(21) Appl. No.: 13/934,345

(22) Filed: Jul. 3, 2013

(65) Prior Publication Data

US 2014/0009323 A1 Jan. 9, 2014

Related U.S. Application Data

(60) Provisional application No. 61/668,154, filed on Jul. 5, 2012, provisional application No. 61/668,161, filed on Jul. 5, 2012.

(30) Foreign Application Priority Data

Jul. 4, 2012 (EP) .................................. 12 175 004
Jul. 4, 2012 (EP) .................................. 12 175 007

(51) Int. Cl.
*G01S 13/08* (2006.01)
*G01S 13/88* (2006.01)
*G01F 23/28* (2006.01)
*H01P 1/08* (2006.01)
*H01P 3/12* (2006.01)
*G01F 23/284* (2006.01)
*H01P 5/08* (2006.01)
*H01Q 13/02* (2006.01)
*H01P 5/02* (2006.01)
*H01P 5/107* (2006.01)

(52) U.S. Cl.
CPC .............. *G01F 23/284* (2013.01); *H01P 5/024* (2013.01); *H01P 5/08* (2013.01); *H01P 5/107* (2013.01); *H01Q 13/02* (2013.01)

(58) Field of Classification Search
CPC ........... G01S 7/00; G01S 13/88; G01S 13/08; G01F 23/284; H01Q 13/0275; H01P 1/08; H01P 3/123; H01P 3/127; H01P 5/08; H01P 5/02
USPC .................... 342/124, 175; 343/771, 772–786
See application file for complete search history.

(56) References Cited

U.S. PATENT DOCUMENTS 3,001,160 A * 9/1961 Trousdale ................. H01P 1/08
333/252
3,860,891 A 1/1975 Hiramatsu
(Continued)

FOREIGN PATENT DOCUMENTS

DE 4 341 052 6/1995
EP 2 093 846 8/2009
(Continued)

*Primary Examiner* — Peter Bythrow
(74) *Attorney, Agent, or Firm* — Fay Kaplun & Marcin, LLP

(57) ABSTRACT

A waveguide coupling includes a planar radiator element which couples the transmission signal into a waveguide of the waveguide coupling. The waveguide widens in the direction of the planar radiator element, in such a way that the radiator element can be of a comparatively large diameter without the inner walling of the waveguide detracting significantly from the signal quality.

16 Claims, 6 Drawing Sheets

(56) References Cited

U.S. PATENT DOCUMENTS

| | | | | |
|---|---|---|---|---|
| 4,689,633 A * | 8/1987 | Saad | ................ | H01Q 19/132 333/251 |
| 5,109,232 A * | 4/1992 | Monte | ................ | H01Q 25/04 333/126 |
| 5,539,361 A | 7/1996 | Davidovitz | | |
| 5,600,290 A * | 2/1997 | Anderson, II | ............ | H01P 1/08 228/124.6 |
| 5,635,944 A * | 6/1997 | Weinstein | ............ | H01P 1/2133 333/106 |
| 5,668,513 A * | 9/1997 | Umezu | .................... | H01P 1/08 333/252 |
| 5,872,494 A * | 2/1999 | Palan | .................... | G01F 23/284 333/252 |
| 5,877,663 A * | 3/1999 | Palan | .................... | G01F 15/10 324/644 |
| 6,437,753 B2 * | 8/2002 | Yuanzhu | ................ | H01Q 9/28 343/772 |
| 6,469,676 B1 * | 10/2002 | Fehrenbach | ......... | G01F 23/284 343/786 |
| 6,720,932 B1 * | 4/2004 | Flynn | .................... | H01Q 5/47 333/21 A |
| 6,927,734 B2 * | 8/2005 | Serban | ................ | G01F 23/284 324/644 |
| 7,204,140 B2 * | 4/2007 | Kallsand | ............ | G01F 23/284 333/252 |
| 7,221,326 B2 * | 5/2007 | Ida | .................... | H01Q 9/28 343/773 |
| 7,453,393 B2 * | 11/2008 | Duivenvoorden | ..... | G01F 23/284 333/32 |
| 7,804,443 B2 * | 9/2010 | Nagaishi | ................ | H01P 5/107 333/247 |
| 7,821,445 B2 * | 10/2010 | Duivenvoorden | ......... | H01P 1/08 342/124 |
| 7,940,207 B1 * | 5/2011 | Kienzle | ................ | G01F 23/284 342/124 |
| 2001/0047685 A1 * | 12/2001 | Lubbers | ................ | G01F 23/284 73/290 R |
| 2002/0030632 A1 * | 3/2002 | Popa | .................... | H01Q 1/40 343/785 |
| 2002/0066314 A1 * | 6/2002 | Lubbers | ................ | G01F 23/284 73/290 R |
| 2002/0067229 A1 * | 6/2002 | Lubbers | .................... | H01P 1/08 333/252 |
| 2003/0151560 A1 * | 8/2003 | Kienzle | ................ | G01F 23/284 343/786 |
| 2005/0083228 A1 * | 4/2005 | Edvardsson | ............. | G01S 7/03 342/124 |
| 2005/0184920 A1 * | 8/2005 | Mahler | .................... | H01P 5/10 343/772 |
| 2005/0253751 A1 * | 11/2005 | Feisst | .................... | G01S 13/08 342/124 |
| 2005/0280480 A1 | 12/2005 | Nakabayashi et al. | | |
| 2006/0000274 A1 * | 1/2006 | Kallsand | ............ | G01F 23/284 73/290 V |
| 2006/0033506 A1 * | 2/2006 | Fehrenbach | ......... | G01F 23/284 324/644 |
| 2006/0158371 A1 * | 7/2006 | Duivenvoorden | ..... | G01F 23/284 342/124 |
| 2008/0186243 A1 * | 8/2008 | Black | .................... | H01Q 9/28 343/773 |
| 2009/0033544 A1 * | 2/2009 | Duivenvoorden | ......... | H01P 1/08 342/124 |
| 2009/0211808 A1 | 8/2009 | Falk et al. | | |
| 2009/0212996 A1 * | 8/2009 | Chen | .................... | H01Q 13/02 342/124 |
| 2010/0123615 A1 * | 5/2010 | Fehrenbach | ........... | H01Q 19/08 342/124 |
| 2010/0141505 A1 * | 6/2010 | Bergmann | ............ | G01F 23/284 342/124 |
| 2011/0025553 A1 * | 2/2011 | Cooke | .................... | G01S 7/032 342/175 |
| 2012/0153969 A1 * | 6/2012 | Eckert | ................... | G01F 23/284 324/637 |
| 2012/0176285 A1 * | 7/2012 | Morgia | ................... | H01P 5/107 343/772 |

FOREIGN PATENT DOCUMENTS

| | | |
|---|---|---|
| GB | 2 187 336 | 9/1987 |
| JP | 2012049862 | 3/2012 |
| WO | 03/069724 | 8/2003 |
| WO | 2007/017170 | 2/2007 |

* cited by examiner

WAVEGUIDE COUPLING, HIGH-FREQUENCY MODULE, FILL-LEVEL RADAR AND USE

REFERENCE TO RELATED APPLICATIONS

This application claims the benefit of the filing date of EP Patent Application Serial Nos. 12 175 004.6 and 12 175 007.9, both filed on 4 Jul. 2012 and U.S. Provisional Patent Application Ser. Nos. 61/668,154 and 61/668,161, both filed on 5 Jul. 2012. The disclosure of above applications is hereby incorporated by reference.

FIELD OF THE INVENTION

The present invention relates to fill-level measurement. In particular, the invention relates to a waveguide coupling for coupling an electromagnetic signal from a high-frequency module into a waveguide, to a high-frequency module comprising a waveguide coupling, to a fill-level radar comprising a high-frequency module and to the use of a waveguide coupling in a field device.

BACKGROUND INFORMATION

Field devices, in particular field devices which are used together with sensors to measure fill levels or boundary positions, are often based on delay measurements. In delay measurements, the signal delays of radar signals or guided microwave pulses are determined. The desired measurement value is subsequently determined from these signal delays.

The signals are of a particular frequency and duration. The radar signals and the microwave signals can be allocated to the high-frequency technology (HF technology) range. As signals which are in the high-frequency range, signals in the frequency range up to 2 GHz are generally used as guided microwave signals, and signals in the range of 5 GHz to 79 GHz and above are used as radar signals.

For safety reasons, it may be necessary for the electronics of the field device to be separated from the measurement environment (for example the inside of a container filled with a filling medium) in an explosion-protected manner. The separation consists for example of a gas-tight seal. This can prevent explosive substances or gas mixtures from reaching the electronics of the field device from the container interior and igniting there.

EP 2 093 846 A1 discloses a gas-tight guide feed-through for a field device, which can provide explosion protection of this type. The guide feed-through is coaxial in form and is used for example in a frequency range of between 5 and 28 GHz.

SUMMARY OF THE INVENTION

The present invention relates to a field device, having explosion protection, which is suitable for transmission frequencies of over 60 GHz.

In accordance with a first aspect of the invention, a waveguide coupling (also referred to as a waveguide connection) for coupling an electromagnetic signal from a high-frequency module into a waveguide is provided. In this context, the electromagnetic signal is generated by the high-frequency module, emitted by a planar radiator element of the waveguide coupling and subsequently transmitted by the waveguide, from a volume defined by a start region of the waveguide, along a volume defined by a main region of the waveguide.

The main region of the waveguide is for example cylindrical in form. However, it may also be a rectangular waveguide. For example, the waveguide is of a constant internal diameter along the main region.

The planar radiator element is arranged in or immediately upstream from the start region of the waveguide, in such a way that the emitted signal is initially located in the start region of the waveguide and propagates in the direction of the main region of the waveguide.

What is essential is that the start region of the waveguide widens towards the planar radiator element. In other words, in the transition region to the main region of the waveguide (that is to say at the point where the start region and main region meet), the internal diameter of the start region of the waveguide is exactly the same as the internal diameter of the main region, whilst the internal diameter of the start region becomes larger towards the planar radiator element.

This means that the planar radiator element can have a relatively large radiator surface and thus a relatively large diameter. As a result, the quality of the signal can be improved.

The electromagnetic signal which is emitted by the planar radiator element may also be referred to as a transmission signal. The planar radiator element may also further be configured so as to receive the reception signal, which is the reflected transmission signal (in the case of a delay-based fill-level measurement device) which has been reflected inter alia on the filling material surface. The planar radiator element may also be in the form of an array of a plurality of radiator elements.

In the following, the terms "start region" and "main region" of the waveguide are to be defined again. The start region of the waveguide is located at the end of the waveguide in the region of which the planar radiator element is located. This start region is widened towards the planar radiator element and thus tapers in the direction of the main region of the waveguide. In other words, the internal diameter of the start region becomes continuously or incrementally (discontinuously) smaller in the direction of the main region. The minimum diameter of the start region is located at the interface between the start region and the main region. At this point, the internal diameters of the start region and the main region are equal.

The main region of the waveguide is for example of a constant internal diameter and extends from the interface between the start region and the main region to the other end of the waveguide.

For example, the main region is of a round or rectangular internal cross-section.

The (transmission) signal, which is emitted by the planar radiator element, migrates in the radiation direction of the planar radiator element through the internal volume responsible for the signal transportation, defined by the start region, and into the main region of the waveguide, and subsequently continues towards the waveguide end or waveguide output.

In accordance with one embodiment of the invention, the main region of the waveguide is arranged at a distance from the planar radiator element in the radiation direction of the signal. In other words, the signal initially covers a particular distance inside the start region of the waveguide before entering the main region of the waveguide.

In accordance with a further embodiment of the invention, the inside of the start region of the waveguide follows a conical progression. In other words, the internal volume defined by the start region of the waveguide is funnel-shaped.

In accordance with a further embodiment of the invention, the inside of the start region follows a hyperbolic progression.

In accordance with a further embodiment of the invention, the inside of the start region follows a stepped progression.

In accordance with a further embodiment of the invention, the internal diameter of the planar radiator element is greater than the internal diameter of the cylindrical main region of the waveguide.

In accordance with a further embodiment of the invention, the diameter of the planar radiator element is less than half, or even a third, of the maximum internal diameter of the start region of the waveguide.

In accordance with a further embodiment of the invention, the waveguide connection has a relative bandwidth of more than 5%, for example even more than 8%, at the frequency of the signal of 79 GHz.

In accordance with a further embodiment of the invention, the planar radiator element is a rectangular, round, elliptical or triangular patch element, which is supplied by a microstrip line.

In accordance with a further aspect of the invention, a high-frequency module for generating a measurement signal for a field device, for example a fill-level measurement device, is provided, the high-frequency module comprising a waveguide coupling as disclosed above and in the following.

In accordance with a further aspect of the invention, a fill-level radar comprising a high-frequency module as disclosed above and in the following is provided.

In accordance with a further aspect of the invention, the use of a waveguide coupling as disclosed above and in the following in a field device is provided. The field device is for example a fill-level measurement device which takes delay measurements so as to determine the fill level therefrom. The signals used for this purpose may be electromagnetic signals, such as microwave or radar signals. In particular, these signals may be pulsed. However, continuous signals may also be used.

In accordance with a further embodiment of the invention, the waveguide coupling is gas-tight. The waveguide coupling comprises the planar radiator element disclosed above, which is arranged on a carrier and serves to emit the signal. The carrier is for example a circuit board.

The waveguide, which is configured so as to transmit the emitted signals, can be connected to the carrier in a gas-tight manner. The waveguide coupling further comprises a dielectric sealing element, which seals the waveguide in a gas-tight manner in the interior thereof. In other words, this sealing element separates a front region of the waveguide, which is located in the region of the planar radiator element, from a rear region of the waveguide, which is located in the region of the probe end (or of the waveguide), that is to say in the direction of the measurement environment.

In accordance with a further embodiment of the invention, the dielectric sealing element is made, for example milled, from a circuit board.

In accordance with a further embodiment of the invention, the dielectric sealing element is a cylindrical plastics material part.

In accordance with a further embodiment of the invention, the dielectric sealing element is a conical or double-cone-shaped plastics material part, which further comprises a cylindrical region in which the sealing element is connected to the waveguide in a gas-tight manner.

In accordance with a further embodiment of the invention, the dielectric sealing element comprises a stepped surface.

In accordance with a further embodiment of the invention, the region of the sealing element in which the sealing element is connected to the waveguide in a gas-tight manner comprises a metal coating, so as to form a gas-tight soldered connection to the waveguide. In the case of an adhesive connection to the waveguide, the metal coating may still be provided (but does not have to be). In particular, the adhesive itself may be metallic.

In accordance with a further embodiment of the invention, the dielectric sealing element comprises a secondary radiator, which is attached to the sealing element or integrated into the sealing element and which receives the signal emitted from the planar radiator element and emits it again. The secondary radiator may also receive the reflected reception signal and emit it in the direction of the planar radiator element.

In accordance with a further embodiment of the invention, the dielectric sealing element seals the waveguide in a gas-tight manner.

In accordance with a further embodiment of the invention, the waveguide comprises an internal, peripheral web on which the dielectric sealing element is laid.

In accordance with a further embodiment of the invention, the dielectric sealing element is arranged in the start region of the waveguide.

In accordance with a further embodiment of the invention, the waveguide comprises an external, peripheral web on which the carrier is laid.

A first central idea of the invention is that the waveguide of a field device comprises an explosion protection, in that the start region thereof (that is to say the region where the transmission signal is coupled in) is sealed off in a gas-tight manner from the measurement environment. This is achieved in that it is connected in a gas-tight manner to the carrier material of the planar radiator element (signal source), on the one hand, and comprises a sealing part (sealing element) which is glued or soldered into the interior region thereof, on the other hand.

A further aspect of the invention is that the transition from the planar radiator element to the waveguide is widened towards the planar radiator element, for example conically, incrementally or hyperbolically.

DETAILED DESCRIPTION

Figure 1:
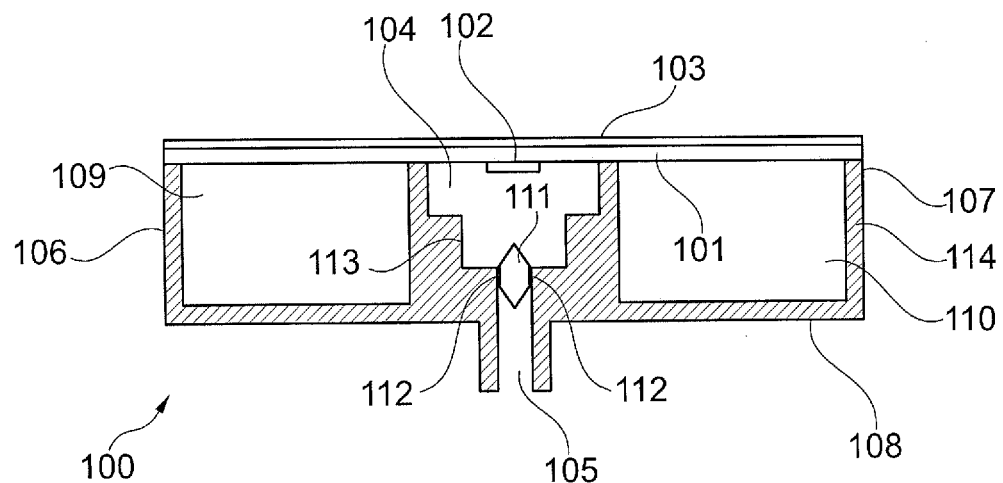
FIG. 1 is a cross-sectional drawing of a waveguide coupling in accordance with one embodiment of the present invention.

The drawings are schematic and not to scale. If like reference numerals are used in different drawings, they may denote like or similar elements. However, like or similar elements may also be denoted by different reference numerals.

FIG. 1 is a cross-sectional view of a waveguide coupling 100 in accordance with one embodiment of the invention. At this point, it should be noted that the waveguide couplings shown in the drawings are connected, by way of example, to the high-frequency module. However, the high-frequency module may also be part of the device 100, referred to here and in the following as a waveguide coupling. In this case, the device 100 could also be referred to as a high-frequency module comprising a waveguide coupling.

In particular, the waveguide coupling may be part of the measuring probe. Alternatively, it comprises an interface in the region of reference numeral 105, to which the continuing waveguide of the measurement probe can be connected.

The waveguide coupling 100 comprises a housing 114 suitable for high frequencies. This HF housing 114 comprises the waveguide 104, 105. In other words, the waveguide 104, 105 is integrated into the HF housing.

Further, the housing may comprise side walls 106, 107 and a rear wall 108, not least for reasons of stability, but also for reasons of better sealing. The waveguide 104, 105 leads through the rear wall 108 in the direction of the planar radiator element 102, which is arranged on the underside of the carrier 101, that is to say in the inside of the HF housing. On the upper side of the carrier 101, there is a metal coating which can serve as an earth plane.

The HF housing 114 may for example be made rotationally symmetrical or rectangular. In the case of the rotationally symmetrical configuration, two concentrically arranged, rotationally symmetrical regions 106, 107 and 104, 105 are thus provided.

The inner rotationally symmetrical region 104, 105 consists of the start region 104 of the waveguide and the main region 105 of the waveguide.

The two regions define a waveguide which is responsible for transmitting the signals.

In the embodiment of FIG. 1, the interior of the start region 104 is of a stepped shape (in this case with two steps; however, there may also be more steps). The stepped inner surface 113 of the outer region 104 widens in the direction of the planar radiator element 102 and tapers in the direction of the main region 105 of the waveguide. At the upper end of the main region 105 of the waveguide, at the point where the main region meets the start region, there is a sealing element 111, which consists for example of dielectric material and is metal-coated (see reference numeral 112) at the point where it touches the inner wall of the waveguide 105.

In the embodiment of FIG. 1, this sealing element 111 is in the form of a double cone, comprising a cylindrical region between the two cones. The external surface of this cylindrical region is metal-coated, in such a way that the sealing element can be soldered or welded onto the inner wall of the main region 105 of the waveguide.

The sealing element 111 may also be glued on.

There may be a cavity 109, 110 between the inner ring, which is formed by the waveguide 104, 105, and the outer ring 106, 107 of the housing.

The waveguide coupling 100 may be used as a waveguide connection. In other words, a waveguide may be connected to the lower region 105.

The waveguide connection 100 can be made gas-tight and can be configured for use together with a microwave module involving strip conductor technology in the frequency range of approximately 79 GHz. In particular, the waveguide connection is integrated into the HF housing 114.

The carrier 101, which may be a circuit board, is connected in a gas-tight manner to the HF housing 114. For example, the HF housing is glued to the carrier.

In this way, the internal cavities 109, 104, 110 can be sealed off from the environment in a gas-tight manner.

The sealing element disclosed above and in the following may be a plastics material part, a ceramics part or a glass part. This sealing element is glued or soldered into the main region of the waveguide.

The transition from the signal-generating electronics to the waveguide is provided by a microstrip line and a patch antenna connected thereto, which forms the planar radiator element.

The widening of the waveguide towards the planar structure is conical, hyperbolic or stepped. In particular, the waveguide and the HF housing may be formed in a single piece.

This results in a simple and cost-effective mechanical construction comprising few individual parts. The arrangement has good high-frequency properties, with a low throughput attenuation and a high reflection attenuation.

In the following, the microstrip-to-waveguide transition will be disclosed by way of example.

A planar structure in the form of a planar radiator element 102 (for example a patch antenna) is attached to the circuit board, and primarily emits orthogonally to the carrier plate 101. The waveguide 104, 105, which is dimensioned in accordance with the frequency range to be transmitted, is placed above this planar structure. This waveguide is widened sufficiently towards the circuit board that the waveguide walls are at a sufficient distance from the planar structure for the influence on the transmission signal from the walls to be reduced.

Other couplings into a waveguide require a high $\in_r$ of the circuit board material, in such a way that the planar structure can be made small enough so as not to be disrupted by the waveguide walls. However, a high $\in_r$ can result in a reduced relative bandwidth of the arrangement, which may be for example between 1% and 3%. This can be a drawback for a broadband radar system. "Relative bandwidth" is understood to mean the ratio of the bandwidth to the central frequency of the transmission signal.

As a result of the widening of the waveguide towards the planar element, a circuit board substrate having a low $\in_r$ can be used, meaning that the relative bandwidth can be raised to approximately 8%. In this case, $\in_r$ is for example between 1.8 and 3.5.

Figure 8:
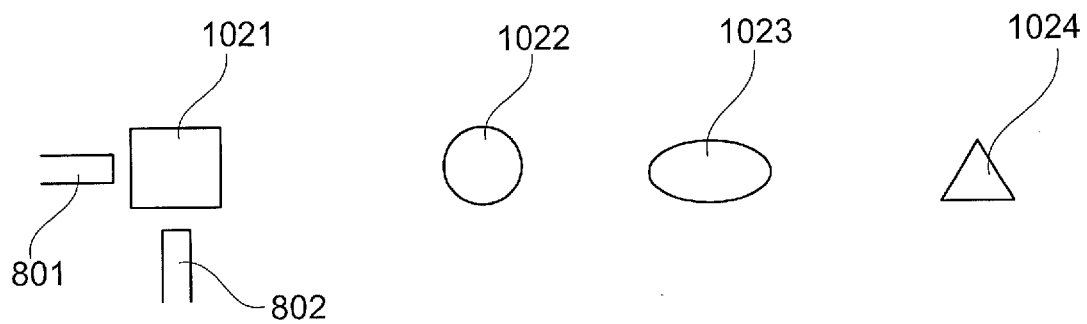
FIG. 8 shows four examples of planar radiator elements, which can be used in a waveguide coupling in accordance with embodiments of the invention.

The planar element 102 may for example be a rectangular patch element 1021, a round patch element 1022, an elliptical patch element 1023 or a triangular patch element 1024 (see FIG. 8).

The patch element can be supplied by the supply line or lines 801, 802 (microstrip lines) directly, via an adapter network or indirectly (via an electromagnetic coupling). An example of indirect supply is shown on the left of FIG. 8.

The widening of the waveguide towards the planar element may be conical, incremental or hyperbolic.

Figure 2:
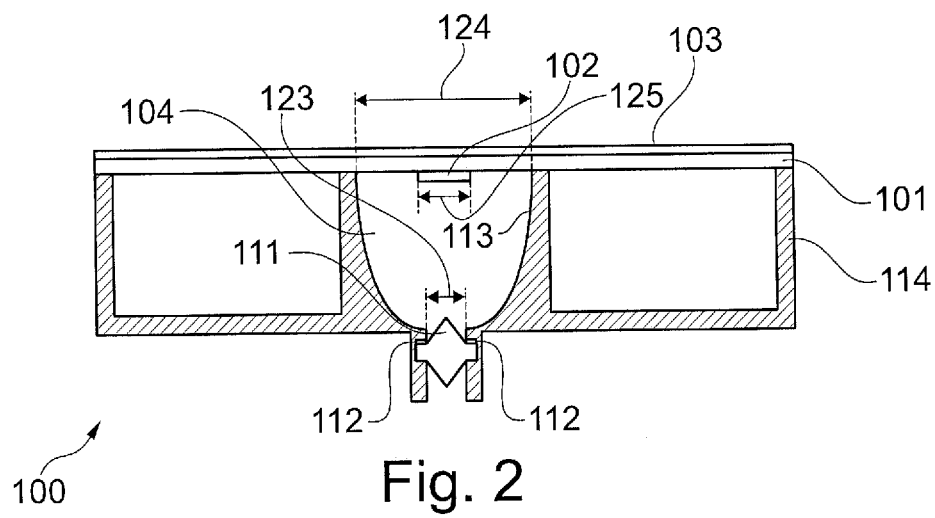
FIG. 2 is a cross-sectional view of a waveguide coupling in accordance with a further embodiment of the invention.
Figure 3:
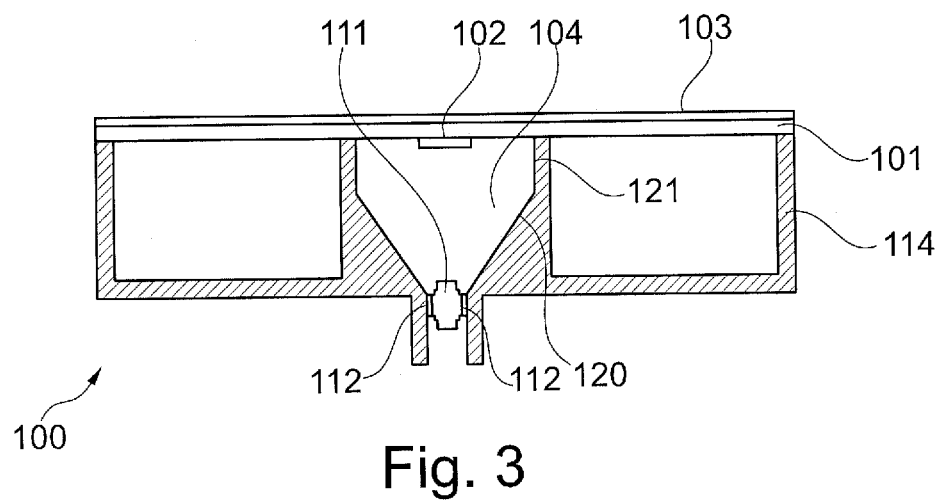
FIG. 3 is a cross-sectional view of a waveguide coupling in accordance with a further embodiment of the invention.
Figure 4:
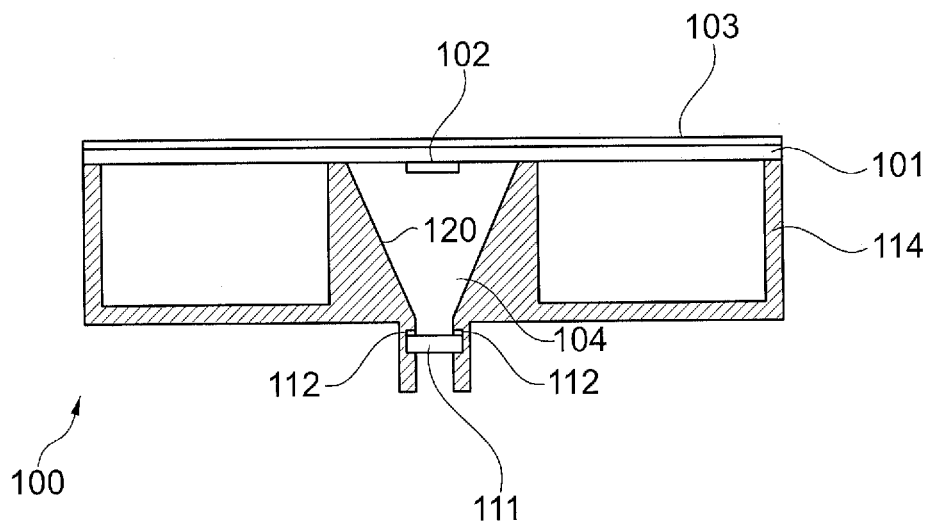
FIG. 4 is a cross-sectional view of a waveguide coupling in accordance with a further embodiment of the invention.

FIG. 2 shows an example of hyperbolic widening, FIG. 3 shows an example of an initially conical widening, followed by a cylindrical region 121, the end of which is glued to the carrier plate 101, and FIG. 4 shows an example of a completely cylindrical widening 120.

FIG. 2 further shows that the diameter 125 of the radiator element 102 is much less than the maximum diameter 124 of the start region 104 of the waveguide. By contrast, the minimum internal diameter 123 of the start region of the waveguide corresponds to the internal diameter of the main region of the waveguide.

This applies to all of the embodiments.

In the following, the aspect of the gas-tight separation (explosion protection) is disclosed in greater detail:

An HF module (or an electronic circuit in general) is separated from the environment in a gas-tight manner for reasons of explosion protection. A gas-tight separation may for example be provided by encapsulating the electronics. However, in the high-frequency field, and especially in microwave technology, encapsulation has a major influence on the HF properties of the circuit. For this reason, the HF housing 114 is glued tightly to the carrier plate (for example a circuit board) in such a way that there is air above the carrier plate 101. This assembly is then in turn encapsulated. The HF signal is passed to the outside, for example in the direction of the filling material, by means of a gas-tight coupling through the housing and the encapsulation.

In particular in a frequency range of 60 GHz and above, a gas-tight passage in a waveguide may be used. This passage is achieved in that a dielectric sealing element 111 is glued into the waveguide or initially metal-coated in part and subsequently soldered in.

In this context, the dielectric 111 may take on a number of forms. For example, it may be in the form of a planar disc of circuit board material, which comprises a metal-coated edge rest for the soldered connection to the waveguide. This is shown for example in FIG. 4.

For this purpose, a round disc may be manufactured from a circuit board substrate (for example HF substrates made of PTFE or PTFE/ceramic mixtures, such as Rogers RT Duroid 5880, Rogers RO 3003 etc.). These discs thus comprise for example a metal-coated edge which can be produced in the normal circuit board process.

Optionally, a secondary radiator can be applied to the disc in the form of slits or metal-coated structures during the circuit board manufacturing process.

The disc can be incorporated into either the cylindrical part or the widened part of the waveguide.

At this point, it should be noted that in general the sealing element 111 need not necessarily be arranged in the main region 105, but may also be arranged in the widened region 104, even though this is not shown in the drawings.

The dielectric sealing element may also be in the form of a cylindrical plastics material part comprising a metal coating on the periphery for the soldered connection to the waveguide (cf. FIG. 6), and in particular it may be attached in the cylindrical part (main region) of the waveguide in this case.

The sealing element may also be in the form of a double-cone-shaped plastics material part comprising a cylindrical neck and a metal coating on the periphery for the soldered connection to the waveguide and may be configured for arrangement in the cylindrical part (cf. FIGS. 1 and 2).

The sealing element may also be in the form of a stepped cylindrical plastics material part comprising metal coating on the periphery for the soldered connection to the waveguide (cf. FIG. 3).

FIG. 2 shows the configuration of the sealing element as a double cylinder (similarly to FIG. 1), but with the intermediate region between the two cylinders being of a greater diameter than the cylinder base (by contrast with FIG. 1, in which the diameters are equal).

Figure 5:
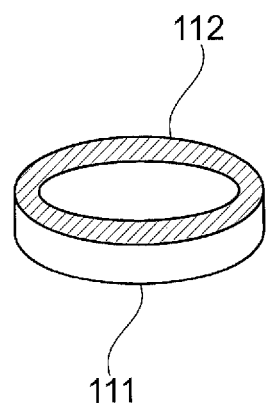
FIG. 5 shows a dielectric sealing element in accordance with one embodiment of the invention.
Figure 6:
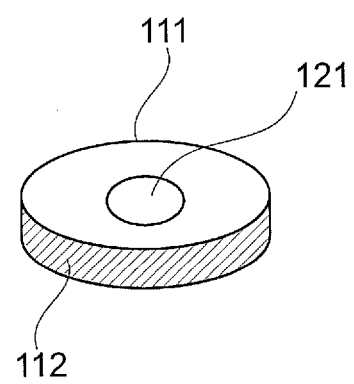
FIG. 6 shows a dielectric sealing element in accordance with a further embodiment of the invention.

FIG. 5 and FIG. 6 show two examples of a dielectric sealing element 111. In the case of FIG. 5, the dielectric sealing element comprises an annular metal coating 112 on the upper side and/or underside thereof. A coating 112 of this type can also be seen for example in FIGS. 2 and 4.

In the embodiment of FIG. 6, the sealing element 111 comprises a peripheral coating 112 on the peripheral face thereof, as is also provided in the embodiments of FIGS. 1 and 3.

The sealing elements 111 may further comprise a secondary radiator 121, which is located on the upper side (as in FIG. 6) and/or on the underside or in the interior of the sealing element 111. The secondary radiator serves to be supplied by the planar radiator element 102. This takes place in that the planar radiator element 102 emits the signal, which is supplied to the secondary radiator, which thereupon emits a corresponding signal into the main region of the waveguide 104.

Figure 7:
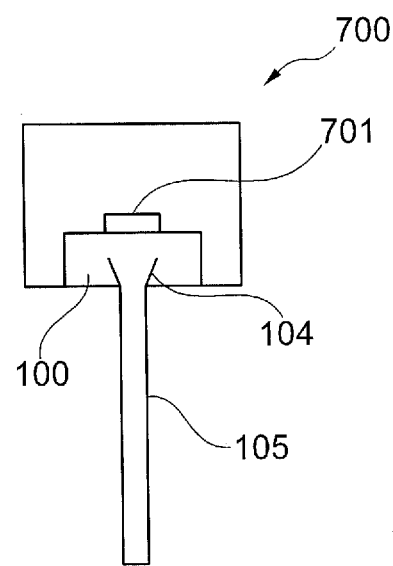
FIG. 7 shows a fill-level measurement device in accordance with one embodiment of the invention.

FIG. 7 shows a fill-level measurement device 700, which comprises a high-frequency module 701. The high-frequency module 701 generates the transmission signal, which is subsequently supplied to the waveguide 104, 105.

Figure 9:
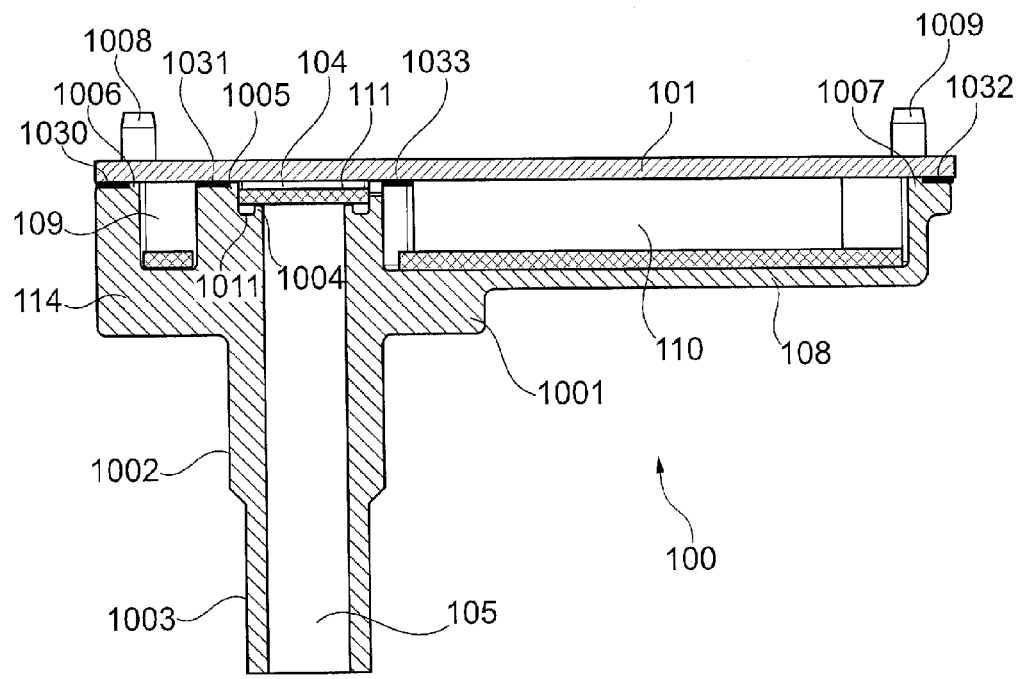
FIG. 9 is a cross-sectional view of a waveguide coupling in accordance with one embodiment of the invention.

FIG. 9 is a cross-sectional view of a waveguide coupling 100 in accordance with one embodiment of the invention. In this embodiment, the sealing element 111 is positioned in the widened start region 104 of the waveguide 104, 105. Furthermore, the sealing element 111 can also be arranged in the start region 104 in the embodiments of FIGS. 1 to 4.

The sealing element is for example a separator plate made of circuit board material. The sealing element may be of a thickness of at least 0.5 mm and may be made of Rogers RO 5880 circuit board material.

The separator plate may be rectangular or square in form. This is expedient in particular if the start region 104 of the waveguide is also of a rectangular or square cross-section. Alternatively, the sealing element 111 may also be of a round cross-section, for example if the cross-section of the start region 104 is also round (circular).

The cross-section of the main region 105 of the waveguide may also be round. This can be seen for example in FIGS. 10 and 12.

The distance between the sealing element 111 and the carrier 101 comprising the planar radiator element (not shown in FIG. 9) is for example 0.2 to 0.3 mm, but may also be more or less. The thickness of the sealing element is for example approximately 0.5 mm.

The carrier 101, which is formed as a circuit board, can be glued and/or soldered onto the housing 114. Soldered connections may for example be provided at the regions 1030, 1031, 1032 and 1033 shown in black.

The soldered connections may also be used for electrical contact between the housing and the carrier 101.

As can be seen in FIG. 9, the diameter or the maximum edge length of the sealing element 111 is greater than the internal diameter of the main region 105 of the waveguide. The diameter or the maximum edge length of the radiator element corresponds approximately for example to the internal diameter of the main region 105 of the waveguide.

Figure 10:
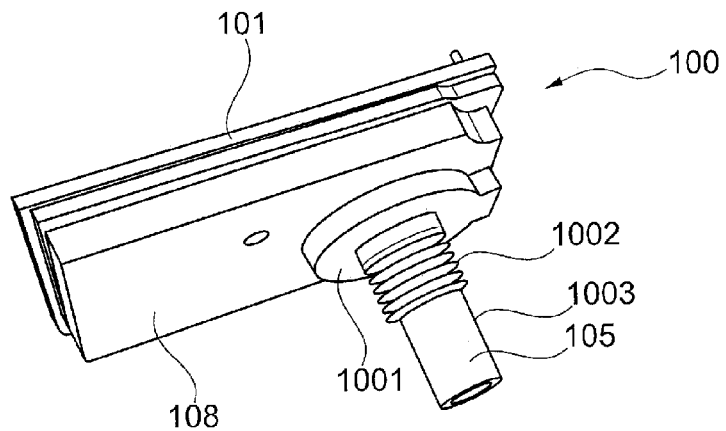
FIG. 10 shows a waveguide coupling in accordance with one embodiment of the invention.

As can also be seen from FIG. 10, the housing 114 is of a substantially rectangular construction. To increase the stability, the housing may comprise a thickening 1001 around the waveguide. The waveguide may also similarly have a thickening 1002, which may be provided with a thread (cf. FIG. 10), at the point where said waveguide exits the housing or the housing thickening.

Subsequently, the waveguide 105 continues at a reduced external diameter 1003. By contrast, the internal diameter of the main region of the waveguide is constant.

Where the starting region 104 of the waveguide transitions into the main region 105 of the waveguide, the waveguide comprises an internal, peripheral web 1004, on which the dielectric sealing element 111 is laid. Further, an external, peripheral web 1005 is provided which is arranged at the end of the waveguide, that is to say at the start of the start region 104 of the waveguide, and is placed on the carrier 101. Between these two webs 1004 and 1005 there is a depression 1011, where the sealing element 111 can be soldered and/or glued to the housing.

Webs 1005, 1006, 1007 on which the carrier 101 is laid are also provided alongside the other soldered or glued regions 1030, 1031, 1032, 1033.

The housing may further comprise tabs or pins 1008, 1009 which are passed through corresponding holes in the carrier 101 so as to position the carrier.

FIG. 10 is a perspective view of a waveguide coupling 100 in accordance with one embodiment of the invention. By contrast with the embodiment of FIG. 9, in this case an external thread is provided in the region 1002 of the waveguide, so as to screw the waveguide coupling into a container flange. Otherwise, the two embodiments are identical.

The external thread can also be used so as to screw on a connection waveguide which continues, that is to say is attached to, the main region 105 of the waveguide of the coupling.

It can be seen from FIG. 10 that the thickening 1001 is largely circular.

Figure 11:
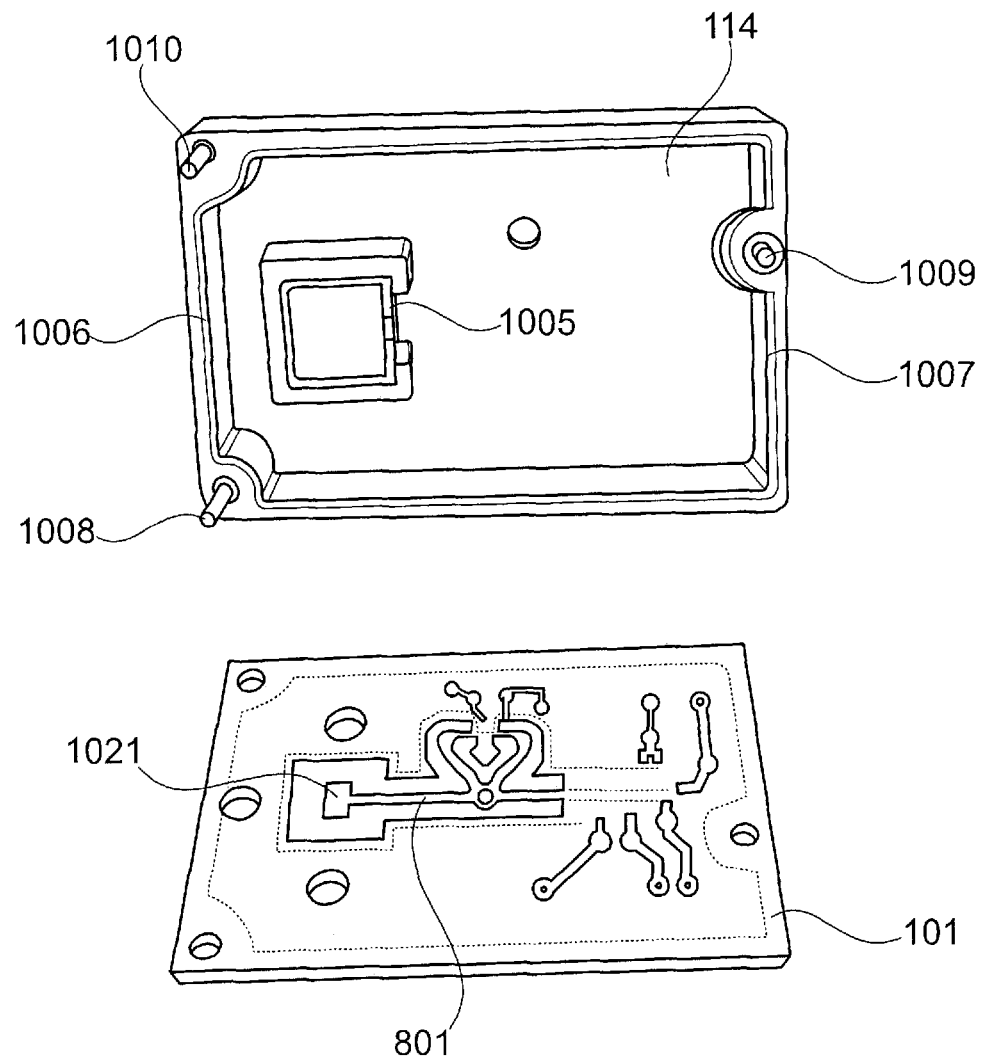
FIG. 11 shows the inside of a housing and the carrier of a waveguide coupling in accordance with one embodiment of the invention.

FIG. 11 shows the inside of the housing 114 and the underside of the carrier 101, that is to say the side facing the inside of the housing.

In particular the planar radiator element 1021, which in this embodiment is rectangular in form, is arranged on the carrier. The longer longitudinal side of the planar radiator element 1021 is of an edge length which substantially corresponds to the internal diameter of the main region of the waveguide.

It can be seen in particular from FIG. 11 that the external, peripheral web 1005 is square in form.

Figure 12:
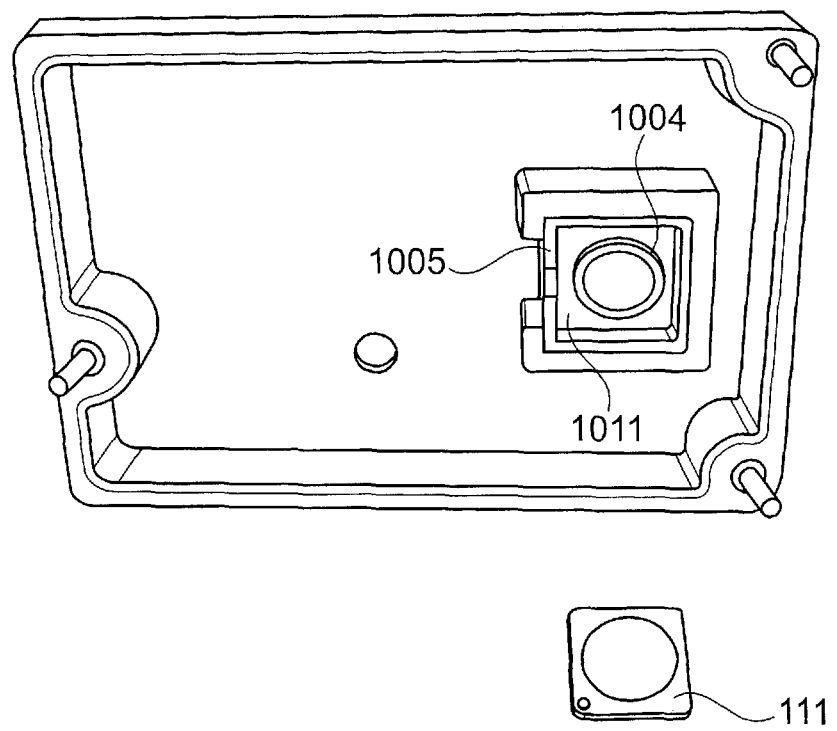
FIG. 12 shows the inside of the housing of FIG. 11 and a dielectric sealing element in accordance with one embodiment of the invention.

FIG. 12 is a further drawing of the housing of FIG. 11 and of a sealing element 111. It can be seen from FIG. 12 that the internal, peripheral web 1004 is circular in form and is arranged concentric with the external web 1005. The sealing element 111 is square in form and is adapted to the size of the external web 1005, in such a way that it can be placed on the lower, internal peripheral web 1004.

At this point, it should be noted that the external, peripheral web 1005 need not be continuous, but may comprise an interruption through which the supply line 801 (cf. FIG. 11) to the planar radiator element is passed.

For completeness, it should be noted that "comprising" and "having" do not exclude the possibility of other elements or steps, and "an" or "a" does not exclude the possibility of a plurality. It should further be noted that features or steps which have been disclosed with reference to one of the above embodiments may also be used in combination with other features or steps of other above-disclosed embodiments. Reference numerals in the claims should not be treated as limiting.

The invention claimed is:

1. A waveguide coupling for coupling an electromagnetic signal from a high-frequency module into a waveguide, comprising:
   a planar radiator element arranged on a circuit board and configured to emit the signal;
   a housing including a rear wall and a waveguide leading through the rear wall, the waveguide being configured to transmit the emitted signal from a volume defined by a start region of the waveguide along a volume defined by a main region of the waveguide; and
   a dielectric sealing element positioned in the waveguide,
   wherein the planar radiator element is one of (a) arranged in the start region and (b) arranged immediately upstream from the start region;
   wherein an internal diameter of the start region in a transition region to the main region is the same as an internal diameter of the main region, and becomes larger towards the planar radiator element; and
   wherein the circuit board is attached to the housing, such that it closes the housing,
   wherein the circuit board, the housing, the waveguide, and the dielectric sealing element form an internal cavity inside the housing, which is sealed off from the environment by the circuit board and the dielectric sealing element in a gas-tight manner.

2. The waveguide coupling according to claim 1, wherein the main region is arranged at a distance from the planar radiator element in the radiation direction of the signal.

3. The waveguide coupling according to claim 1, wherein an inside of the start region follows a conical progression.

4. The waveguide coupling according to claim 1, wherein an inside of the start region follows a hyperbolic progression.

5. The waveguide coupling according to claim 1, wherein an inside of the start region follows a stepped progression.

6. The waveguide coupling according to claim 1, wherein a diameter of the planar radiator element is greater than an internal diameter of the main region.

7. The waveguide coupling according to claim 1, wherein the waveguide includes an internal, peripheral web on which the dielectric sealing element is laid.

8. The waveguide coupling according to claim 1, wherein the dielectric sealing element is arranged in the start region.

9. The waveguide coupling according to claim 1, wherein a diameter of the planar radiator element is less than half of a maximum internal diameter of the start region.

10. The waveguide coupling according to claim 1, wherein a diameter of the planar radiator element is less than third of a maximum internal diameter of the start region.

11. The waveguide coupling according to claim 1 wherein the housing is connected in a gas-tight manner to the circuit board.

12. The waveguide coupling according to claim 11, wherein the waveguide includes an external, peripheral web on which the circuit board is laid.

13. A high-frequency module for generating a measurement signal for a fill-level measurement device, comprising a waveguide coupling according to claim 1.

14. A fill-level radar, comprising:
   a high-frequency module generating a measuring signal and including a waveguide coupling according to claim 1.

15. A field device, comprising;
   a waveguide coupling according to claim 1.

16. The waveguide coupling according to claim 1, wherein the planar radiator element is arranged on the side of the circuit board which faces the internal cavity.

* * * * *